US012742644B2

(12) United States Patent
Brown

(10) Patent No.: US 12,742,644 B2
(45) Date of Patent: Sep. 22, 2026

(54) ALTERNATIVE SYSTEMS AND METHODS FOR GLOBAL POSITIONING, NAVIGATION, AND TIMING

(71) Applicant: NAVSYS Corporation, Colorado Springs, CO (US)

(72) Inventor: Alison Brown, Colorado Springs, CO (US)

(73) Assignee: NAVSYS Corporation, Colorado Springs, CO (US)

( * ) Notice: Subject to any disclaimer, the term of this patent is extended or adjusted under 35 U.S.C. 154(b) by 74 days.

(21) Appl. No.: 18/613,775

(22) Filed: Mar. 22, 2024

(65) Prior Publication Data

US 2025/0216202 A1 Jul. 3, 2025

Related U.S. Application Data

(60) Provisional application No. 63/454,251, filed on Mar. 23, 2023.

(51) Int. Cl.
*G01C 21/16* (2006.01)
*G01S 19/24* (2010.01)

(52) U.S. Cl.
CPC .............. *G01C 21/16* (2013.01); *G01S 19/24* (2013.01)

(58) Field of Classification Search
CPC ....... G01C 21/16; G01S 19/24; G01S 5/0205; G01S 5/0226; G01S 19/02; G01S 19/03; G01S 19/49
See application file for complete search history.

(56) References Cited

U.S. PATENT DOCUMENTS

| | | | | |
|---|---|---|---|---|
| 7,254,191 | B2 * | 8/2007 | Sugar | H04W 16/14 375/228 |
| 11,681,050 | B2 * | 6/2023 | Grgich | G01S 19/44 342/357.62 |
| 11,977,171 | B2 * | 5/2024 | Li | G01S 19/252 |
| 2010/0026578 | A1 * | 2/2010 | Furnanz | H01Q 1/38 343/895 |
| 2012/0182181 | A1 * | 7/2012 | Dai | G01S 19/41 342/357.31 |
| 2019/0208387 | A1 * | 7/2019 | Jiang | G01S 1/0428 |

(Continued)

*Primary Examiner* — Kito R Robinson
*Assistant Examiner* — Kevin Jerome Harvey, II
(74) *Attorney, Agent, or Firm* — Mughal Gaudry & Franklin PC

(57) ABSTRACT

A system for navigation comprising a network for providing a position, navigation, and timing (PNT) service in which a monitor station collects snapshots from satellite signals with a high gain antenna, and publishes the snapshots and associated data to the network. Reference stations access the published snapshots, calculate a reference time of arrival (TOA) for the signal, and publish the reference TOA to the network. Remote stations access the snapshot and reference TOA information and develop a PNT solution for their location. A method for providing PNT as a service to network subscribers in which monitor stations publish snapshots from signals of opportunity, reference stations publish reference TOAs for the snapshots, and remote stations use the published snapshot and reference TOA information to determine a PNT solution. A method of developing a PNT solution in which a remote station accesses information published to a network to develop a pseudo-range.

19 Claims, 6 Drawing Sheets

| BAND | FREQUENCY | SIGNAL SOURCE | DESCRIPTION |
|---|---|---|---|
| L | 1 - 2 GHz | GNSS 1166-1602 MHz | GEO - GPS AND OTHER GNSS SIGNALS |
| | | IRIDIUM SATELLES 1616-1626.5 MHz | LEO - IRIDIUM TOA UPDATE SIGNALS |
| S | 2 - 4 GHz | GLOBALSTAR 2483.5-2500 MHz | MEO - TOA UPDATE SIGNALS AVAILABLE IN CONUS AND EUROPE |
| C | 4 - 6 GHz | INTELSAT/SES/OTHERS 3700-4200 MHz | GEO - MULTIPLE SOOP SOURCES |
| X | 8 - 12 GHz | GLOBAL BROADCAST SERVICE (GBS) | GEO - MILSATCOM |
| Ku | 12 - 18 GHz | STARLINK 10.7-12.7 GHz | GEO, LEO - AVAILABLE WORLDWIDE |
| K | 18 - 27 GHz | GBS 20.2-21.2 GHz | MILSATCOM AND PRIVATE AVAILABLE WORLDWIDE |

(56) References Cited

U.S. PATENT DOCUMENTS

| | | | | |
|---|---|---|---|---|
| 2022/0124534 | A1* | 4/2022 | Bao | H04W 24/08 |
| 2022/0345417 | A1* | 10/2022 | Kasichainula | H04L 47/30 |
| 2022/0404454 | A1* | 12/2022 | Agee | G01S 5/0268 |
| 2023/0126365 | A1* | 4/2023 | Romeu | G01S 5/02213<br>342/357.78 |
| 2023/0273861 | A1* | 8/2023 | Nazari | G06F 21/566<br>714/20 |
| 2023/0284178 | A1* | 9/2023 | Parker | H04W 64/00<br>455/456.1 |
| 2023/0291469 | A1* | 9/2023 | Billman | H04B 7/18523 |

* cited by examiner

| BAND | FREQUENCY | SIGNAL SOURCE | DESCRIPTION |
|---|---|---|---|
| L | 1 - 2 GHz | GNSS<br>1166-1602 MHz | GEO - GPS AND OTHER GNSS SIGNALS |
| | | IRIDIUM SATELLES<br>1616-1626.5 MHz | LEO - IRIDIUM TOA UPDATE SIGNALS |
| S | 2 - 4 GHz | GLOBALSTAR<br>2483.5-2500 MHz | MEO - TOA UPDATE SIGNALS AVAILABLE IN CONUS AND EUROPE |
| C | 4 - 6 GHz | INTELSAT/SES/OTHERS<br>3700-4200 MHz | GEO - MULTIPLE SOOP SOURCES |
| X | 8 - 12 GHz | GLOBAL BROADCAST SERVICE (GBS) | GEO - MILSATCOM |
| Ku | 12 - 18 GHz | STARLINK<br>10.7-12.7 GHz | GEO, LEO - AVAILABLE WORLDWIDE |
| K | 18 - 27 GHz | GBS<br>20.2-21.2 GHz | MILSATCOM AND PRIVATE AVAILABLE WORLDWIDE |

FIG.1

$$f = f_0\left(1 + \frac{|Vo| * \cos(\Theta)}{c}\right)$$

ALTERNATIVE SYSTEMS AND METHODS FOR GLOBAL POSITIONING, NAVIGATION, AND TIMING

CROSS-REFERENCE TO RELATED APPLICATIONS

This application claims priority to U.S. Provisional Application No. 63/454,251, filed Mar. 23, 2023, which is hereby incorporated by reference herein in its entirety.

STATEMENT REGARDING FEDERALLY SPONSORED RESEARCH OR DEVELOPMENT

The disclosed invention was made, at least in part, with support from the U.S. Government under Contract Number N68936-22-C0001, awarded by the United States Navy/Naval Air Systems Command/NAWCWD. The U.S. Government has certain rights in the disclosed invention.

BACKGROUND

Field of the Invention

The disclosed invention relates to systems and methods for providing alternative global position, navigation, and timing information using satellite signals of opportunity to update inertial guidance and clock systems.

Relevant Background

Competitors and adversaries of the United States have spent the last several years developing capabilities to jam or spoof Global Positioning System (GPS) Position, Navigation and Timing (PNT) signals. Military and civilian planners in the United States and elsewhere therefore anticipate contingencies in which Global Navigation Satellite System (GNSS) supplied PNT data is rendered either regionally or globally unavailable for extended periods. Solutions exist to provide alternative or back-up PNT capabilities for lesser severities of GNSS denial, such as localized jamming, or short-duration regional GNSS denial. However, existing solutions become increasingly ineffective where GNSS denial is widespread or extends for a substantial period of time.

To address long-term regional or global denial of GNSS position and timing information, alternative solutions that do not rely on GNSS satellite constellations are needed. The disclosed invention allows existing broadband communications satellites to be used as signals of opportunity (SoOP) to bound inertial and clock errors and allow non-GNSS navigation devices, such as inertial guidance systems, to maintain accurate positioning and timing during extended periods of GNSS unavailability. The disclosed system provides a reliable and cost-effective global alternative to GNSS navigation.

Systems providing alternative PNT solutions using signals of opportunity are known in the art, however the disclosed PNT as a service network provides several advantages. Because it is constructed with an Internet of Things architecture, the disclosed system functions as a mesh-type network providing redundancy and resilience not available to prior systems that are based on point-to-point architectures. Prior systems using SoOP suffered inadequate performance due to the low signal to noise ratio (SNR) of most commercial SATCOM signals. For example, a prior system attempted to use Iridium narrowband signals to bypass the low SNR of broadband SATCOM SoOP. Prior systems also use small omni-directional antennas to collect SoOP, which chronically fail to achieve adequate SNR to provide reliable PNT data. The disclosed system, however, uses published SoOP snapshots collected by high gain antennas, which provides high SNR for better performance. The use of published high fidelity SoOP snapshots also allows use of monitor stations that are not required to remain at a known location or time reference, and allows remote user stations to use low size, weight, power, and cost computing resources. Finally, the disclosed network establishes a marketplace of published alternative PNT information. Publishers to the marketplace are incentivized to provide high quality SoOP data from multiple sources throughout the world. The marketplace concept therefore promotes resilient and accurate alternative PNT to replace denied GNSS data.

These and other deficiencies of the prior art are addressed by one or more embodiments of the disclosed invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out hereafter.

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying drawings and figures imbedded in the text below and attached following this description.

FIG. 1 is a table listing potential satellite signals of opportunity for use with embodiments of the disclosed invention.

Figure 2:
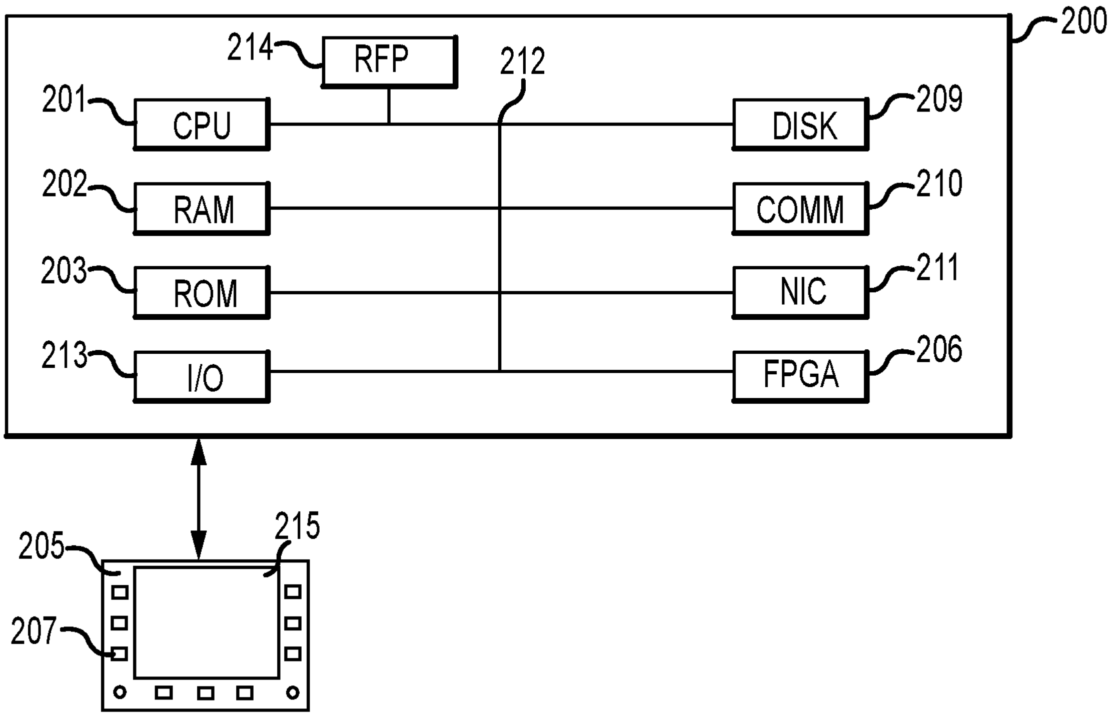
FIG. 2 depicts a specialized computer system as used in an embodiment of the disclosed invention.

The Figures depict embodiments of the present invention for purposes of illustration only. One skilled in the art will readily recognize from the following discussion that alternative embodiments of the structures and methods illustrated herein may be employed without departing from the principles of the invention described herein.

Definitions

PNT means position, navigation, and timing information. Specifically, position refers to an object's latitude, longitude, and altitude/elevation relative to the surface of the earth. Navigation means an object's ability to move from one known location to another known location. Timing means an object's ability to determine the current local time at its position.

A-PNT, or Assured PNT, means a system for determining a PNT solution to a high degree of resilience for a required level of accuracy.

PNT as a Service (PNTaaS) means the provision of assured PNT information through an Internet of Things protocol wherein PNT information is published for use by subscribers of the service.

Internet of Things (IoT) architecture means a scalable distributed computing network wherein devices interact with the network through a cloud-based software application.

Global Navigation Satellite Systems (GNSS) means one of several global satellite-based systems providing autonomous PNT information.

Global Positioning System (GPS) is a type of GNSS deployed by the United States.

DETAILED DESCRIPTION

The disclosed invention relates to systems and methods for using satellite signals of opportunity to provide a reliable alternative navigation system to replace GPS in the event of an extended outage.

Disclosed herein is a PNT service constructed with an Internet of Things architecture that publishes PNT information derived from satellite signals of opportunity to subscribers via a network. Monitor stations use high gain antennas to capture high quality signal snapshot and timing information from the signals of opportunity and publish them to a PNTaaS marketplace. Distributed reference stations use the published PNT signal of opportunity information to develop local time of arrival data for relevant snapshots, which the reference stations then publish to the PNTaaS marketplace. Subscribers use published PNT and time delay data to update onboard Assured PNT systems comprising a Software Defined Radio (SDR) with an inertial navigation system and precision clock. By regularly updating and correcting A-PNT systems with SoOP-derived PNT information, subscribers can sustain operations in an extended GNSS-denied environment. GPS and other Global Navigation Satellite Systems operate at fixed frequencies in the L-band (1-2 gigahertz (GHz)), making them easy targets for jamming or spoofing. The SDR allows signal observations from alternative SATCOM signal sources across a range of frequency bands for improved resilience.

The Internet of Things (IoT) based architecture, e.g., a Data Distribution Service (DDS) architecture leverages a widely used and scalable framework that can accommodate a high performance, world-wide implementation of the PNT service of the disclosed invention. Further, the DDS framework incorporates features ensuring the disclosed service is accessible only by authorized users and that is resistant to cyber-security threats.

There are ample potential signals of opportunity for use by the present invention available from among deployed commercial communications satellites. While dedicated navigation satellites have very limited allocated spectrum, satellite communication services generally have significant frequency allocations in the 3-30 GHz range. As of early 2023, the U.S. FCC listed nearly 200 approved geostationary (GEO) satellites for broadcast, fixed, and mobile satellite services, and around 40 approved Non-Geostationary Satellite Orbit (NGSO) systems. Also available are proliferated low earth orbit (LEO) systems, including over 4,000 Starlink satellites, 700 OneWeb satellites, 120 Telesat satellites, 70 Iridium satellites, and 40 satellites from O3B, with thousands more launches announced. With reference to FIG. 1, some potential SATCOM signals of opportunity and their allocated bands of spectrum are shown.

The disclosed invention will now be described in detail with reference to several embodiments thereof as illustrated in the accompanying figures. In the following description, specific details are set forth in order to provide a thorough understanding of embodiments of the disclosed invention. It will be apparent, however, to one skilled in the art that embodiments may be practiced without some or all of these specific details. In other instances, well known process steps and/or structures have not been described in detail in order to not unnecessarily obscure the invention. The features and advantages of embodiments may be better understood with reference to the drawings and discussions that follow.

It should be apparent to those skilled in the art that the described embodiments of the disclosed invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the disclosed invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the disclosed invention as the embodiments disclosed herein are merely exemplary.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used to describe one element or feature's relationship to another element(s) or feature(s) as illustrated in the figures. Such spatially relative terms are intended to encompass different orientations of a device in use or operation in addition to the orientation depicted in the figures. For example, if a device in the figures is inverted, elements described as "under," or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used for AI-guided and conventional algorithmic processes. Each block and combinations of blocks depicted in the flowchart illustrations, can be implemented by computer program instructions. These computer program instructions may be loaded onto a computer, a special purpose hardware-based computer system, or other programmable apparatus to produce a machine such that the executed instructions create means for implementing the functions specified in the flowchart block or blocks. These computer program instructions may also be stored in a computer-readable memory that can direct a computer or other programmable apparatus to function so that the instructions produce an article of manufacture that implements the function specified in the flowchart block or blocks. The computer program instructions may also be loaded onto a computer or other programmable apparatus to cause a series of operational steps to be performed so that the executed instructions provide steps for implementing the functions specified in the flowchart block or blocks.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Specialized Computer System

Portions of the disclosed invention may be implemented, at least in part, on a specialized computer system, e.g., a software defined radio. FIG. 2 is a general block diagram of a special-purpose computer system in which software-implemented processes of the disclosed invention may be embodied. As shown, the system 200 comprises one or more central processing unit(s) (CPU) or processor(s) 201 coupled to a random-access memory (RAM) 202, a read-only memory (ROM) 203, a fixed storage device 209 (e.g., hard disk, flash drive), a communication (COMM) port(s) or interface(s) 210, a high-speed network interface card (NIC) 211, and may include a radio frequency (RF) processor 214. The system can be accessed by a network-connected computing device, such as an aviation terminal 205 having a user interface 207, e.g., input buttons and knobs, or a keyboard and a display 215 (e.g., screen, touchscreen, or monitor), or in some embodiments may be accessed through a software interface, e.g., a software application for piloting an unmanned aerial vehicle. Although not shown separately, a real time system clock is included with the system 200, in a conventional manner.

The CPU 201 comprises a suitable processor for implementing the disclosed invention. The CPU 201 communicates with other components of the system via a bi-directional system bus 212, and any necessary input/output (I/O) controller 213 circuitry and other "glue" logic. The bus, which includes address lines for addressing system memory, provides data transfer between and among the various components. RAM 202 serves as the working memory for the CPU 201. ROM 204 contains the basic I/O system code (BIOS), which is a set of low-level routines in ROM that application programs and the operating systems can use to interact with the hardware, including reading characters from the keyboard, etc. Some embodiments include a graphics processing unit (GPU) (not shown) to add processing capability to the system.

Mass storage devices 209 provide persistent storage on fixed and removable media, such as magnetic, optical, or magnetic-optical storage systems, flash memory, or any other available mass storage technology. The mass storage may be shared on a network, e.g., cloud storage, or it may be a dedicated mass storage device. As shown in FIG. 2, fixed storage 209 stores a body of program instructions and data for directing operation of the computer system, including an operating system, user application programs, driver, and other support files, as well as other data files of all sorts. Typically, the fixed storage 209 serves as the main memory for the system.

In operation, program logic (including that which implements methodology of the disclosed invention described herein) is loaded from fixed storage 209 into the main (RAM) memory 202, for execution by the CPU 201. During operation of the program logic, the system 200 accepts user input from another computing device, a keyboard, a mouse, input buttons 207, a touchscreen 215, etc. The user interface 207, permits selection of application programs, entry of software application-based input or data, or keyboard-based input, and selection and manipulation of individual data objects represented by a software application or displayed on the screen or display 215. Likewise, the user interface 207, such as input buttons, a mouse, or a digit in the case of a touch screen, permits selection and manipulation of objects on the display device. In this manner, these input devices support automatic or manual user input for any process running on the system. In some embodiments, the computer system 200 displays text and/or graphic images and other data on the display device 215. A Field Programmable Gate Array (FPGA) 206 provides a flexible logic resource for performing certain specialized complex functions.

The system itself communicates with other devices (e.g., other software defined radios, servers, or computers) via a port on the NIC 211 that is connected to a network (e.g., cellular, WIFI, SATCOM, or Ethernet). The system may also communicate with local occasionally connected devices (e.g., serial cable-linked devices) via the COMM interface 210, which may include a serial port, a Universal Serial Bus (USB) interface, or the like. The SDR operates with a transceiver module that includes an RF processor 214 for receiving and processing RF signals collected using an omnidirectional antenna or other suitable antenna.

The system may be implemented through various networks and their associated communication devices. Such networks may include SDRs, servers, modems, or computers, such as a gateway computer or application server which may have access to a cloud computing system. A gateway computer serves as a point of entry into each network and may be coupled to another network by means of a communications link. The gateway may also be directly or indirectly coupled to one or more devices using a communications link, or may be coupled to a storage device such as a data repository or database.

PNTaaS Architecture

The disclosed alternative navigation system may be configured to offer PNT as-a-Service (PNTaaS) to subscribers. Participants on the PNTaaS network use an Internet of Things protocol to publish and subscribe to the network. The IoT protocol encrypts participant data and performs authentication to protect access to the network, and to protect the integrity of published information. A subscribed user can access the network, where they have visibility into the available SoOP, ephemeris or satellite location data, snapshot information, etc., and can subscribe to selected data from any monitor or reference or other PNT information publisher. Each participant in the network publishes or subscribes individually. The network is a mesh-type network, hosted on either the participants' individual processing and memory capacity, or cloud computing resources. A relay allows participants to view publishers and subscribers.

Figure 3:
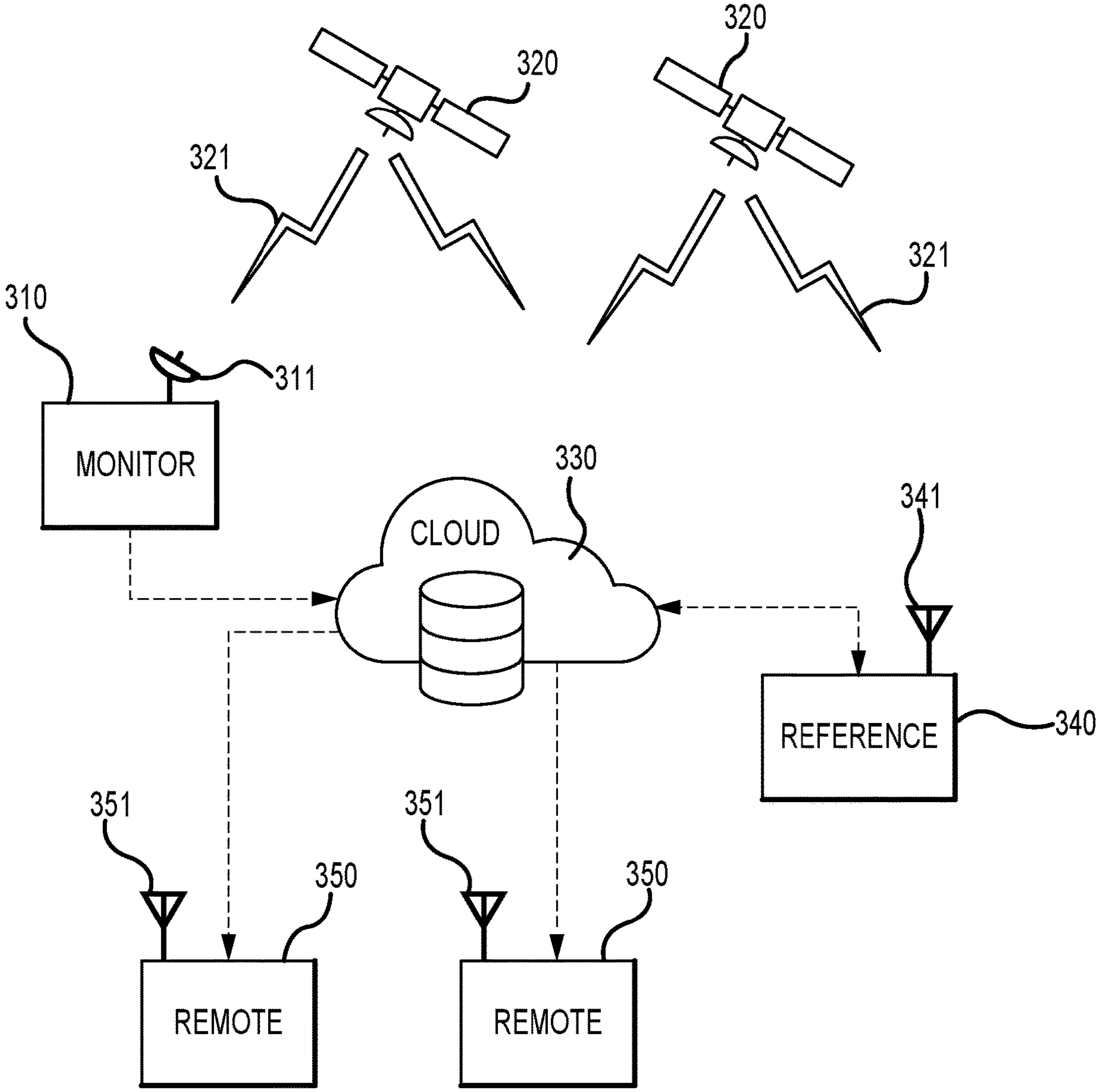
FIG. 3 depicts a block diagram of a representative PNTaaS network as used in embodiments of the disclosed invention.

With reference to FIG. 3, an example PNTaaS IoT network is depicted. One or more monitor stations 310 receives signals of opportunity 321 broadcast by GEO, MEO, and/or LEO satellites 320. The monitor station may include one or more high-gain or steered array antennas 311 to observe the SATCOM broadcasts, or the monitor station may access signal broadcasts received by external high-gain or steered array antennas. The monitor station also includes an SDR to record a snapshot of the satellite signal at a specified time mark. A snapshot captured by the monitor station is accompanied by a packet of data about the snapshot, including the SoOP satellite identifier, the time mark of the snapshot, the center frequency of the signal, the sample rate, the duration of the snapshot, and the interval at which new SoOP snapshots will be captured. The monitor station then publishes the snapshot and accompanying data to the network. Other entities may also publish information to the network. For example, commercial satellite companies may publish highly accurate location information for their satellites, or may publish their own signal snapshots and accompanying data for use on the network. Alternatively, a SATCOM terminal may function as a monitor station, providing snapshots, timing data and ephemeris or location data directly to the network. The system does not require a monitor station to have a known location or time reference.

One or more reference stations 340 within a region of interest subscribe to and publish to the PNTaaS network to provide local timing information for multiple SoOP. A reference station includes an SDR and one or more broadband omni antennas 341 to observe multiple locally-available SoOP. The reference station also includes direct or indirect access to a master clock, such as the U.S. Naval Observatory master clock, and may include a high precision internal clock. The reference station's internal timing reference allows it to establish and publish to the network a common time mark for a particular SoOP snapshot. A reference station's local time mark for a snapshot is required due to inherent delays in the snapshot timing as captured by a monitor station. Delays caused by the monitor station's 310 use of a high-gain dish or phased array antenna can be substantial, and could therefore bias any correlation with the snapshot to calculate a time of arrival (TOA). Therefore, these delays need to be calibrated and the reference units provide compensation for any offset in the snapshot timing collected by the monitor stations.

In operation, a reference station subscribes to a subset of published data from satellite signals that are visible to the reference station 340. Using the published SoOP data, the reference station captures its own snapshot from each subscribed SoOP, at the time slot and interval used by the publisher, and calculates a reference time of arrival. The reference TOA is the time at which the snapshot was received at the reference station, and is precisely time-tagged to the reference station internal timing reference. The reference TOA is calculated by cross-correlation between a published snapshot and the corresponding reference station snapshot. Such cross-correlation between the published snapshot timing and the reference snapshot timing is accomplished in near real-time through use of a Fast Fourier Transform algorithm that runs on firmware in the reference station SDR.

The reference station then publishes the reference TOA along with the reference station's precise location to the PNTaaS network 330. Remote users 350 can subscribe to one or more reference stations and use the reference TOAs to correct for timing offsets in the published monitor station snapshots, allowing remote users to create a precise local pseudo-range observation from published SoOP snapshot data. Reference TOAs therefore allow remote users to use unsynchronized SoOP, since the external timing references of a particular set of time-synchronized satellites are not required.

Subscribers to the PNT service have access to published snapshots and other data by connecting their remote receiver 350 to the network 330. The remote station is an SDR with one or more broadband omni antennas 351 and a precision local clock. For static receivers, the known location of the SDR antenna is entered so that the remote station can calibrate its local time reference, and output a 1 pulse per second (pps) signal, and optionally a 10 MHz signal, that is synchronized to the PNTaaS network master time reference. Such outputs allow a user to use the remote receiver as an external calibrated clock reference. For mobile receivers, an inertial measurement unit may be included to provide dead-reckoning navigation between SoOP updates, and SoOP observations can be used to update both the remote receiver's time reference and its inertial navigation solution.

A subscriber accessing the network is presented with a marketplace for various types of PNT information, such as information from certain publishers, specific signals of opportunity, information provided by commercial satellite companies, locations of satellite orbits, etc. The subscriber can choose what information to receive based on resources, SDR reception capability, antenna configuration, processing capability, known or persistent local signal interference, signal band preference, location, areas of operation, types of vehicle, etc. For example, a subset of preferred SoOP may be selected based on the subscriber's navigation requirements, or the threat environment facing the remote station. The flexibility of SoOP and other PNT information used by remote receivers provides a high degree of resilience, since subscriber units can adapt to threats by leveraging a wide array of different signals, operating on different frequency bands, using one or more broadband antennas, and with signal options continually updated as new satellite systems come online. Further, the system's use of monitor stations equipped with high-gain antennas to capture SoOP snapshots allows remote receivers to be simpler, lower capability devices, which improves system practicality.

Once a subscriber has chosen a set of PNT information for subscription, the subscriber configures its receiver to use the selected PNT information. For example, a subscriber may set up an internal snapshot capture sequence to use a set of subscribed SoOP. The capture sequence may include setting their SDR to the SoOP frequency, and timing a snapshot capture to correspond to a published snapshot's timing. The remote receiver then observes an SoOP snapshot and develops a receiver time of arrival for the signal using the receiver's internal clock or time reference to cross-correlate with the corresponding SoOP snapshot published by the monitor station. The remote receiver also subscribes to the published satellite location and local reference TOAs from the network to correct for local clock error and allow association to the network master clock. Then the remote receiver calculates a pseudo-range (PR) and uses the PR to update and correct onboard inertial navigation and timing solutions.

Pseudo-Range Calculation

The fundamental calculation required for updating PNT data for remote receivers is a pseudo-range calculation, which is also the basic value provided by GNSS systems.

The monitor stations publish snapshot and the timing sequence data for various SoOP to the PNTaaS network, and the reference stations publish reference TOA data for locally observable SoOP wherein each snapshot is associated with a precise internal reference time. A subscribing remote receiver accesses the published snapshot and timing data via the network, and captures its own snapshot at the published time for a particular SoOP. The remote receiver stores its snapshot internally.

Figure 4:
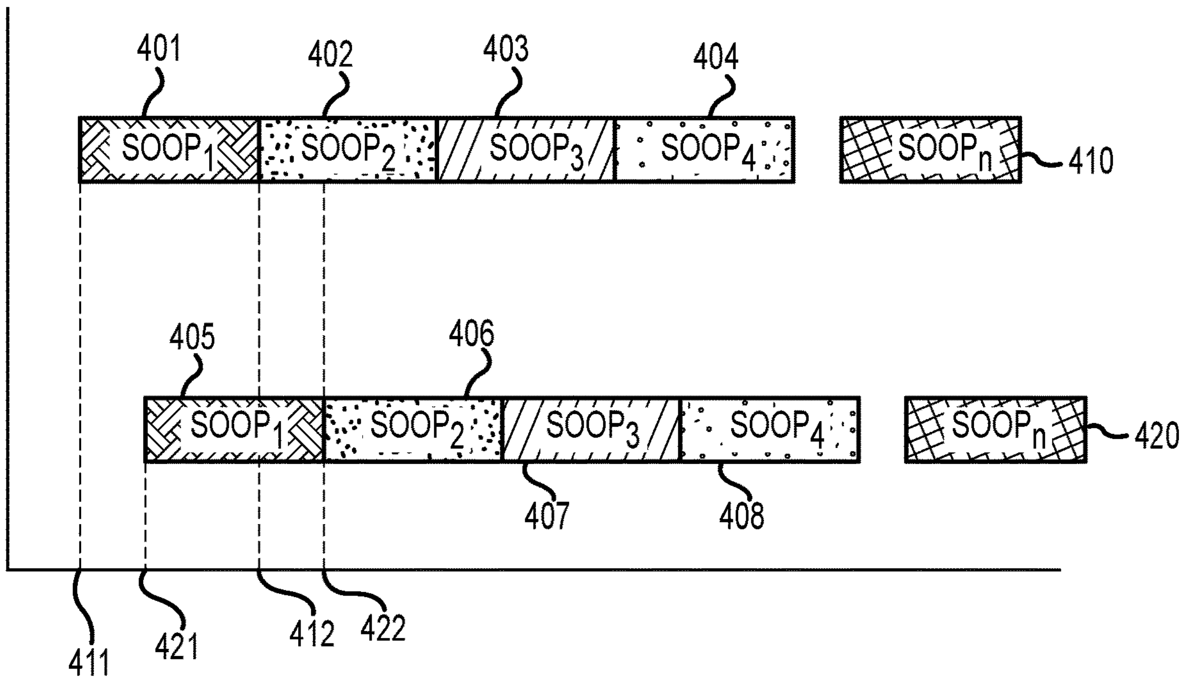
FIG. 4 depicts a block diagram showing temporal relationships among signals of opportunity as used in embodiments of the disclosed invention.

With reference to FIG. 4, a block diagram showing snapshot correlation is depicted. A reference station 410 subscribes to PNT data on various SoOP, collects snapshots on a subset of the published SoOP 401, 402, 403, 404, and publishes reference TOAs for each signal through the PNTaaS network. Similarly, a remote receiver 420 subscribes to PNT data on a subset of SoOP and collects its own snapshots 405, 406, 407, 408, for each signal. The remote receiver then determines a TOA for each signal relative to its internal clock. Then the remote receiver performs a difference analysis between its internal TOAs and the published reference TOAs for each signal. For example, the reference station publishes a reference TOA 411 for $SoOP_1$ 401, and a reference TOA 412 for $SoOP_2$, while the remote receiver calculates a remote TOA 421 for $SoOP_1$, and a remote TOA 422 for $SoOP_2$. Taking the shared snapshot duration, the remote receiver determines a TOA offset between the reference station and remote receiver, represented here as the difference between 412 and 421. Snapshot correlation among monitor, reference, and remote receivers can only be performed if there is snapshot duration and interval timing overlap to allow measurement of a TOA offset. Therefore, snapshot capture is synchronized so that the monitor station publishes data captured in time slots that overlap among monitor, reference stations, and remote receiver. In a representative implementation, SoOP snapshots are published with a duration of 85 milliseconds (ms). This duration allows overlap among network participants even if there are multiple milliseconds of errors in the timing synchronization among participants at start up.

Using the TOA offset and the reference receiver location, the remote receiver calculates a pseudo-range ($PR_{REM}$) through the following equation:

$$PR_{REM} = (TOA_{REM} - TOA_{REF}) + R_{REF} = R_{REM} + Bu \qquad \text{(Equation 1)}$$

Where $R_{REF}$ is the range from a broadband satellite source for a signal of opportunity to the location of the reference station calculated from the satellite ephemeris published to the PNTaaS network. Where $R_{REM}$ is the range from the satellite to the location of the remote receiver calculated from the satellite location as published to the network. And where Bu is the TOA offset of the remote receiver local time as calculated using the reference station time reference.

The pseudo-range calculated through Equation 1 and the published satellite location data are then used to update the inertial and clock PNT solution developed by the remote receiver. A software application run by the remote receiver SDR includes data fusion algorithms that allow delayed pseudo-range observations to update the real-time inertial and clock PNT solutions. The PNTaaS system is therefore unaffected by network latency effects.

Signal to Noise Ratio and TOA Accuracy

The TOA calculated using Equation 1 will have an accuracy value that is a function of the signal to noise ratio (SNR), which accounts for the observed SoOP signal power as received by the SDR, the sampled bandwidth, the length of the SoOP snapshot, and the SDR processing loss. The disclosed PNTaaS system is configured to achieve a comparable SNR to dedicated GPS and other GNSS, and comparable bandwidth for the SoOP signal captures, and thus a comparable level of accuracy. Normally, a receiver for broadband communications satellites must include a high gain dish antenna or steered antenna array to achieve the link margin required for proper data demodulation. Deploying such antennas to each remote receiver and reference station in the PNTaaS system would be impractical. Accordingly, only the monitor station is equipped with a high gain antenna, or in some embodiments, provided access to existing high gain antenna data. Using these antennas, the monitor station captures and publishes SoOP snapshot data with high SNR to the PNTaaS network.

As a result, when reference stations and remote receivers correlate the published SoOP snapshot with their observed SoOP snapshot, SNR is a function of the SoOP duration, the received signal/noise power in the bandwidth of the SoOP, and processing loss at the receiver SDR. Assuming the reference stations and remote receivers use an SDR with a zero-gain omni-antenna, and a 5 decibel (dB) processing loss, SoOP durations in the 85 millisecond range provide SNRs in the range of 22 dB for the TOA correlation, which is comparable to that of GPS. The system's use of monitor stations to capture SoOP snapshots with high SNR allows system users to employ simpler, lower power remote receivers with inexpensive low-gain omni-directional antennas.

Software Defined Radio PNT Device

Figure 5:
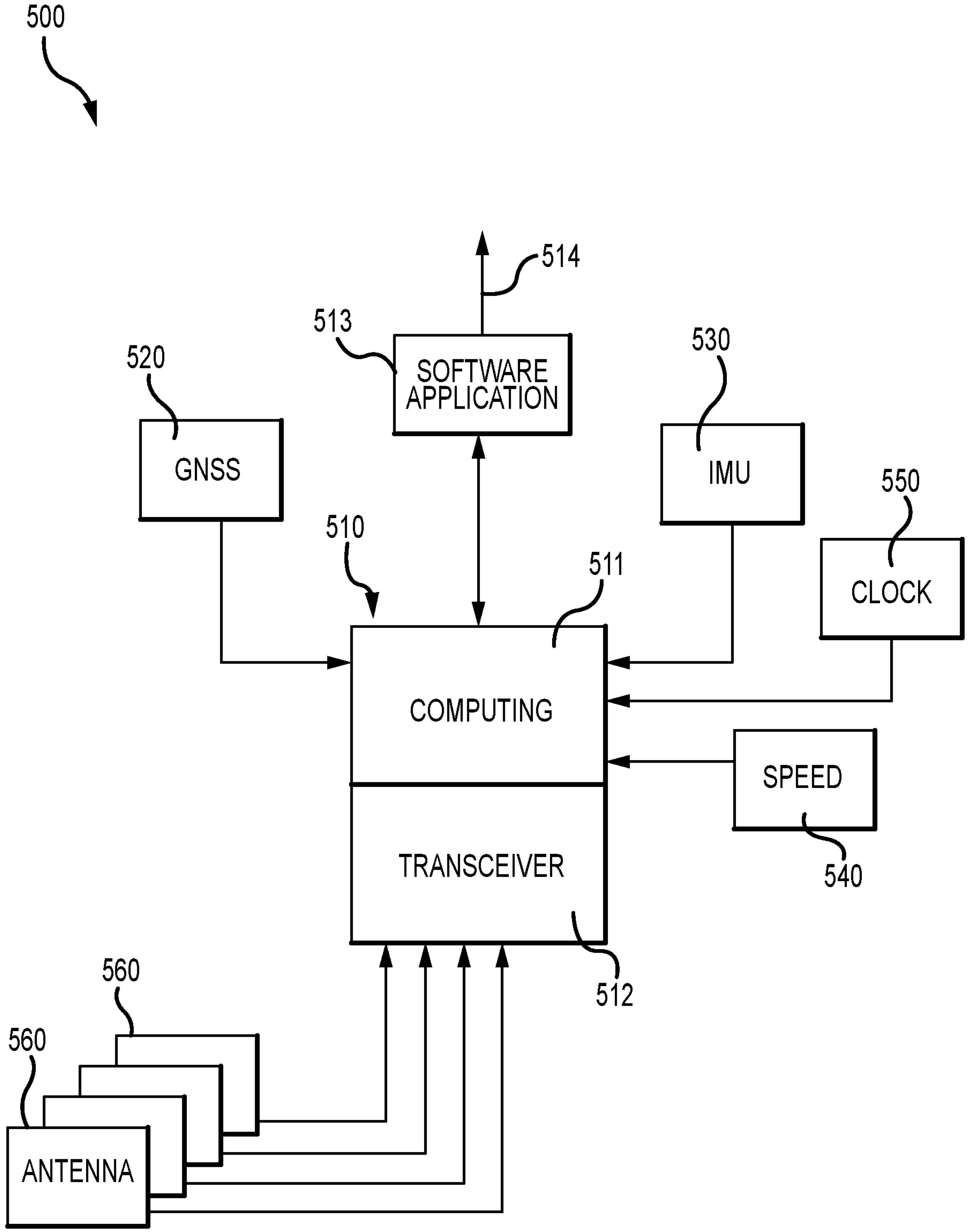
FIG. 5 depicts a block diagram of a receiver station as used in embodiments of the disclosed invention.

The disclosed PNTaaS system is configured to use specialized SDRs at the reference stations and remote receiver locations. A representative mobile PNTaaS SDR couples a radio module capable of operating over multiple frequency bands with an inertial measurement unit and clock module. With reference to FIG. 5, an example PNTaaS SDR configuration 500 is depicted. The SDR 510 includes a computing module 511 and a transceiver module 512. The computing module may be, for example, a specialized computing system as depicted in FIG. 2. The computing module operates the transceiver module, and runs a software application 513. The SDR is modular in design and configured to operate with interchangeable input components. In some embodiments, the SDR 510 also receives PNT data input from a GPS or GNSS unit 520, which also supplies range information directly to the fusion algorithm. An inertial measurement unit (IMU) 530 provides inertial measurement data to the computing module. Optionally other A-PNT aiding sources, such as a speed sensor 540 provides vehicle speed data to the computing unit for use in the fusion algorithm. A chip-scale atomic clock (CSAC) or oven-controlled crystal oscillator (OCXO) 550 is used to provide a stable internal SDR clock for time tagging SoOP data. An antenna array 560, or single broadband omnidirectional antenna, provides broadband satellite data to the transceiver 512. The array includes antennas configured to receive signals from a broad range of frequencies, e.g., L-Band, S-band, C-Band, X-band, Ku-band, and/or Ka-band satellite frequency bands. Each antenna in the array may be tuned to a subset of frequencies, and in some embodiments antennas in the array are tunable to cover multiple frequency bands. Other navigation aids may also be integrated into the SDR through the fusion algorithm, including, for example, an altimeter, ground-based waypoint updates, zero velocity updates, a selective availability anti-spoofing module (SAASM) based GPS module, an M-Code GPS receiver, satellite imagery aiding, or other suitable PNT input source.

A mobile PNTaaS SDR provides a tightly coupled inertial navigation solution and clock integration with precise time synchronization, while a static PNTaaS SDR provides tightly coupled clock integration with a known location to provide precise time synchronization and serve as a timing reference.

The PNTaaS SDR 510 is configured to integrate inputs from multiple SoOP sources and other observations into a single fused output for the A-PNT solution developed by the SDR. Such coordination requires all SDR navigation inputs to be tied to a common SDR time reference. In particular, use of SoOP snapshots taken at different times, on different frequencies, and from different sources must be coordinated to the same time reference in order to observe a common range and calculate an accurate TOA offset. Further, all IMU, velocity, and other modular navigation inputs also must be time-tagged to the common SDR time reference. The SDR accomplishes such time coordination by deriving all hardware time synchronization function (HW TSF) values via a FPGA phase locked loop (PLL) which is driven by an onboard, e.g., an OCXO unit, or external high-quality reference oscillator that is bound by the software to the master reference clock. Once coordinated, the software application 513 uses the available navigation inputs to calculate a fused A-PNT solution 514.

The SDR's precise time coordination allows different SoOP sources to update the A-PNT solution sequentially from a single SDR channel without a loss of precision. The SDR is configured to capture signal snapshots from frequencies in the L-band, S-band, and C-band directly, and in some embodiments, uses a low-noise block downconverter to down convert and capture snapshots from higher frequency signals, e.g., X-band, Ku-band, and Ka-band. The SDR can sequence rapidly over these different frequencies and create hundreds of snapshot observations derived from available signals of opportunity from different satellites, within tens of seconds. The SDR can then use the collected snapshot observations to update the inertial and clock PNT solution. To allow such rapid sequencing, the computing module 511 is configured to command the transceiver 512 to rapidly retune to different frequency bands, to perform synchronized snapshot capture over multiple RF channels, perform high-speed data transfer, and high-speed buffering of the snapshots to allow further signal processing.

Correlated to the transceiver's ability to retune rapidly, the SDR is also configured to switch rapidly between antennas in the array 560. Each SDR channel is accordingly able to accommodate multiple different antennas for fast onboard RF switching. In addition to the antenna switching required by operation over several frequency bands, the SDR may also switch antennas due to motion of the remote receivers. If a remote receiver is mounted in a vehicle such as an aircraft, ship, or automobile, the vehicle's orientation may result in a satellite becoming obscured and its signals unavailable. The SDR is therefore configured to perform rapid antenna switching to accommodate SoOP frequency selection, and to adjust to an SoOP becoming unavailable based on attitude information provided by the IMU 530.

Satellite Geometry Determinations

The disclosed PNTaaS system provides optimal A-PNT updates when using SoOP from a combination of satellites in geosynchronous (GEO) and non-geosynchronous (NGSO) orbits. GEO satellites are useful for SoOP navigation aiding chiefly because they provide ample coverage over a large portion of earth's surface. A large number of satellites are in view at any one time for most latitudes, with coverage waning toward the poles. However, PNT solutions relying solely on signals from GEO satellites suffer from the fact that all GEO satellites are located in the same plane, i.e., the equatorial plane, and therefore cannot provide a 4D geometry. Because they are co-planar, signals from GEO satellites can at best only observe three degrees of freedom at high latitudes when aided by a calibrated clock, or two degrees of freedom at low latitudes.

At higher latitudes, with only GEO SoOP signals available, the PNTaaS SDR can supplement the PNT solution with additional inputs from a coordinated clock 550 or altimeter (not shown) to provide adequate geometry. Nearer to the equator, the geometry would still be insufficient, since altitude and clock observability are also co-planar with the equator and GEO satellite orbits. A typical Chip Scale Atomic Clock, for example, might exhibit random drifts of $1E^{-11}$ meters every 1000 seconds, meaning that time errors can be expected to drift at only 3 millimeters (mm) per second. Therefore, when periodic clock calibrations are available, and altitude aiding is available, GEO-only solutions can provide adequate updates to maintain assured PNT.

Use of SoOP from satellites in Low Earth Orbit (LEO) presents different observational geometry than that of GEO satellites. Because their orbits are substantially lower, LEO satellites have a smaller coverage footprint than GEO satellites. LEO satellites also move relative to the earth's surface, and therefore are observable by the SDR for a finite time window, known as a pass or transit. As the LEO satellite transits the SDR's observable window, received SoOP can provide at best a two degree of freedom update to the PNT solution. Therefore, like a GEO-only solution, a LEO-only solution is inadequate to update a PNT solution.

Figure 6:
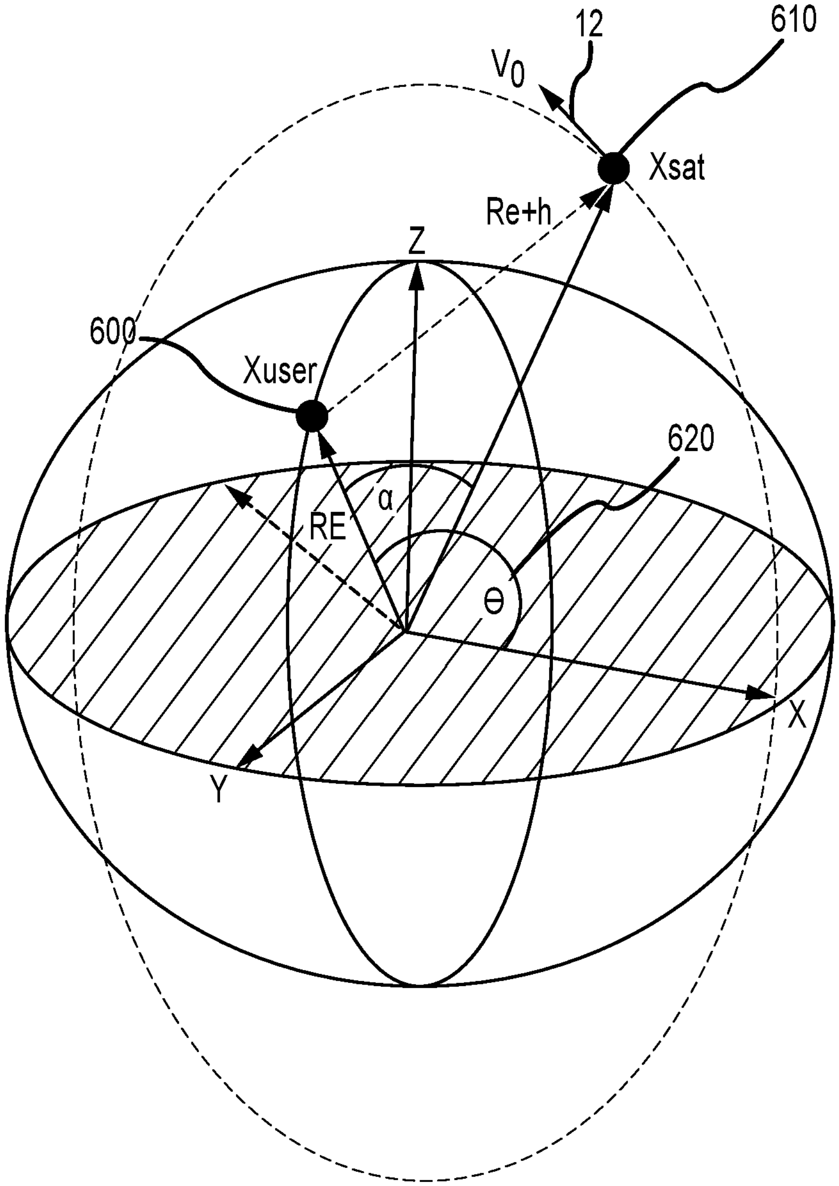
FIG. 6 depicts a diagram of Doppler determination of location degrees of freedom as used in embodiments of the disclosed invention.

The SDR can, however, use LEO satellites to derive a 4D solution using Doppler shift observations. With reference to FIG. 6, is depicted an example geometry for using LEO doppler shift to update a PNT solution. With the SDR located at 600, as the LEO satellite 610 transits the observable window in the direction of the arrow 12, the SDR observes the doppler shift of the satellite signal and uses the observed rate of change to determine the time of closest approach, or signal of closest approach, between the SDR and the satellite 610, as well as the ascension from orbit 620. In this way, two degrees of freedom are derived from doppler shift information. When added to the two degrees of freedom TOA calculation provided by a SoOP snapshot from the satellite during its transit window, a full 4D update can be developed. Typically, multiple satellites in LEO or medium earth orbit (MEO) will be observable by an SDR at any one time or during a short duration, i.e., less than 10 minutes, and can be used to construct a composite PNT solution.

Additionally, some LEO satellite constellations provide additional navigation information that can also be used to aid the PNT solution. These include, for example, TOA information provided through Iridium time and location signals, or Xona Pulsar TOA signals. Starlink constellation satellites broadcast pilot tones that can be used to provide doppler-only updates. These TOA observations can be also collected at a reference station and be published to the PNTaaS network with the known signal content to allow them to be used as SoOP. For LEO satellite signals that include broadband pseudorandom data content, e.g., Starlink or OneWeb, a LEO SATCOM terminal may serve as a monitor station. The satellite terminal includes a high gain antenna that is used to increase the SNR of the signal to provide sufficient link margin for the SATCOM data link to operate. By connecting a PNTaaS SDR to the intermediate frequency (IF) output from the SATCOM terminal's high gain antenna and down-conversion unit, snapshots can be captured and published directly from the SATCOM terminal. Other reference or remote units that are in the same footprint of the LEO satellite's beam can subscribe to the snapshot data published by the SATCOM terminal and use those signals to derive a PNT solution.

While an SDR of the disclosed system can develop sufficient PNT updates using either GEO or NGSO satellites, a solution using SoOP from a composite of GEO and NGSO satellites is a preferred mode of operation. With GEO satellites providing persistent coverage, and LEO or MEO satellites providing superior geometries for lower latitudes, combined observations allow four degrees of freedom solutions for A-PNT calibrations by the SDR. The PNTaaS network can accommodate an indefinite number of satellite signals and is not reliant on any one constellation or satellite service provider. Such flexibility allows new signals to be added to the service as new satellites are launched. The network can also accommodate terrestrial signals of opportunity if monitor or reference units are equipped to process such signals and located so that the terrestrial signals are visible. The IoT protocol provides dynamic awareness to subscribers on what SoOP are available at any given time and allows filtering of SoOP to select only signals that are in view of the subscriber's receiver and that are compatible with the subscriber's receiver.

When multiple SoOP sources are available, the SDR performs a selection process to determine which SoOP will be included in the PNT update solution. In addition to performing real-time threat detection as addressed below, the SDR evaluates available signals according to the following example process. First, the SDR filters the published SoOP data based on the published SoOP center frequency, e.g., L-band, C-band, etc., or orbit type and location, e.g., GEO, MEO, or LEO. The monitor stations publish the SoOP data with a unique identifier for each SoOP. Precise location data for satellite associated with a given SoOP is also published to the network periodically. The SoOP location data services can be provided by third parties, such as the satellite operators, or can also be calculated using orbital determination software, such as the NASA Jet Propulsion Laboratory's GIPSYx software, using reference TOAs from the network of reference stations. Using the published satellite location and the remote receiver location, an elevation is calculated for the satellite, and satellites having an elevation above a selected mask angle are selected. The elevation angle is set to facilitate antenna reception, ensure adequate geometry, or other suitable criteria. Then the remaining satellites are sorted based on their degree of separation from each other, and the satellites that provide the best geometry for an A-PNT solution, with sufficient redundancy for assured operation are selected. Satellites may also be selected based on frequency separation to avoid deliberate or incidental spectral interference. Once a subset of satellites is selected for use, the remote receiver subscribes to the selected SoOP only, which reduces the data traffic required to construct the PNT update solutions.

Fast Fourier Transform

The signal processing demands placed on the PNTaaS SDR computing module, see FIG. 5, item 511, by the A-PNT updating process may be considerable. Such real-time processing requirements are facilitated by SDR firmware which is configured to perform simultaneous complex in-phase and quadrature data capture, and also to perform real-time fast Fourier transforms (FFT) on the sampled data. Use of FFT-based correlation for TOA observations is not only computationally efficient, FFT capability also allows rapid doppler searching for acquisition of LEO signals. FFT-based correlation and doppler searching is accomplished through the following equation:

$$R(TOA, \Delta f) = IFFT(circshift(FFT_{REM}, \Delta f) * conj(FFT_{MON}) \quad \text{Equation (2)}$$

Where $FT_{REM}$ is the FFT of the remote receiver snapshot data. $FFT_{MON}$ is the FFT of the published monitor station snapshot data. And Δf is the shift to search over [−Fsearch: Fsearch]*T integer doppler intervals where Fsearch is the peak doppler frequency and T is the snapshot FFT length in seconds.

The SDR is also configured to use FFT spectrograms to perform real-time RF threat detection and mitigation. The SDR creates FFT spectrograms on observed SoOP snapshots in real time, and then compares the spectrograms to signal profiles contained in a neural net. The neural net is trained on verified signal profiles that are generated from prior collected signals using machine learning (ML) algorithms. Based on comparison to verified signal profiles through the neural net, the A-PNT module selects or deselects new signals for inclusion in the PNT update solution. Signals showing evidence of tampering, spoofing, or other alterations, i.e., they deviate from the neural net's verified signal profiles, are excluded from the A-PNT solution. A neural net may be generated and trained locally on a PNTaaS SDR, or a neural net may be published to the PNTaaS network for use by subscribers.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words," "materials," etc. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate additional alternative structural and functional designs for a system and a process for providing hardened operational network nodes through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope of the invention.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

While this invention has been described in terms of several embodiments, there are alterations, modifications, permutations, and substitute equivalents, which fall within the scope of this invention. Although subsection titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

This has been a description of the disclosed invention along with a preferred method of practicing the invention.

What is claimed is:

1. A system for navigation, comprising:

a network for communicating positioning, navigation, and timing (PNT) information to a subscriber;

a monitor station having access to a high gain antenna for receiving a signal broadcast from a satellite, wherein the monitor station uses the high gain antenna to capture a snapshot from the signal and publishes the snapshot to the network;

a reference station including a first software defined radio (SDR), wherein the reference station has access to the network and develops a reference time of arrival (TOA) for the snapshot and publishes the reference TOA to the network; and a remote receiver including a second software defined radio, wherein the remote receiver has access to the network and uses the snapshot and the reference TOA to develop a PNT solution.

2. The system of claim 1, wherein the remote receiver includes a fusion algorithm that receives a set of inputs from one or more of the following: an inertial measurement unit, a global navigational satellite system, a speed sensor, and a clock, and wherein the remote receiver uses the set of inputs and the PNT solution to develop an updated PNT solution.

3. The system of claim 1, wherein the remote receiver includes one or more antennas for receiving one or more of the following bands of radio frequencies: an L-Band, an S-band, a C-Band, an X-band, a Ku-band, and a Ka-band.

4. The system of claim 1, wherein the remote receiver includes a radio frequency (RF) receiver configured to perform onboard frequency switching and synchronized snapshot capture over a plurality of bands of radio frequencies.

5. The system of claim 1, wherein the remote receiver uses an omnidirectional antenna to collect a remote snapshot from the satellite, and uses the remote snapshot to calculate a remote TOA and to develop the PNT solution.

6. A method for providing positioning, navigation, and timing as a service (PNTaaS), the method comprising:

collecting, using a monitor station and a high gain antenna, a snapshot of a signal of opportunity broadcast by a satellite;

associating the snapshot with a data packet that includes a satellite identifier, a time of collection, and a collection interval;

publishing the snapshot and the data packet to a network;

providing the snapshot and the data packet to a reference station that is a network subscriber, and wherein the reference station generates a reference snapshot from the signal, and a reference time of arrival (TOA) of the snapshot, and publishes the reference TOA and a reference station location to the network; and providing the snapshot, the data packet, and the reference TOA to a remote receiver that is a network subscriber, wherein the remote receiver generates a remote snapshot from the signal and a remote time of arrival (TOA) of the snapshot, and develops a PNT solution.

7. The method for providing PNTaaS of claim 6, the publishing step further comprising publishing satellite location data, and wherein the publishing step is performed by one of the following: a commercial satellite communications terminal, or a commercial satellite operator.

8. The method for providing PNTaaS of claim 6, wherein the signal of opportunity may be one of the following bands of radio frequencies: an L-Band, an S-band, a C-Band, an X-band, a Ku-band, and a Ka-band.

9. The method for providing PNTaaS of claim 6, further comprising:

setting a snapshot duration and a snapshot interval to allow the remote receiver to measure a TOA offset for the signal.

10. The method for providing PNTaaS of claim 6, further comprising: publishing a master clock reference to the network, and wherein the remote receiver generates a time reference signal that is synchronized with the master clock reference.

11. The method for providing PNTaaS of claim 6, wherein the network is a mesh network with an internet of things architecture.

12. A method of developing a positioning, navigation, and timing (PNT) solution at a remote receiver, comprising:

accessing a snapshot captured by a high gain antenna from a signal broadcast by a satellite, wherein the snapshot is published to a network;

generating a remote snapshot from the signal comprising a remote time of arrival (TOA) relative to a remote time reference;

receiving a reference identifier indicating a reference station, a location of the reference station, a reference TOA of the signal, and a reference range that is observed from the satellite to the reference station;

determining a remote time of arrival relative to a remote clock;

generating a pseudo-range from the satellite to the remote receiver; and developing the PNT solution at the remote receiver using the pseudo-range.

13. The method of developing a PNT solution at a remote receiver of claim 12, wherein the pseudo-range equals $$TOA^i_{REM} - TOA^i_{REF} + R^i_{REF} = R^i_{REM} + Bu,$$

wherein $$TOA^i_{REM}$$

is the remote time of arrival, $$TOA^i_{REF}$$

is the reference TOA, $$R^i_{REF}$$

is a reference range, $$R^i_{REM}$$

is a remote range that is observed from the satellite to the remote receiver, and Bu is a clock offset of the remote TOA for the signal.

14. The method of developing a PNT solution at a remote receiver of claim 12, wherein a monitor station publishes a snapshot duration and a snapshot interval to allow the remote receiver to measure the TOA offset.

15. The method of developing a PNT solution at a remote receiver of claim 12, wherein a set of location data about the satellite is published to the network.

16. The method of developing a PNT solution at a remote receiver of claim 12, further comprising:

generating a Doppler observation for the satellite; and developing the PNT solution at the remote receiver using the Doppler observation.

17. The method of developing a PNT solution at a remote receiver of claim 12, the accessing step further comprising:

performing a Fast Fourier Transform (FFT) on the snapshot to create a snapshot FFT spectrogram; and comparing the snapshot FFT spectrogram to signal profiles in a neural net to determine suitability of the snapshot for a pseudo-range calculation.

18. The method of developing a PNT solution at a remote receiver of claim 17, wherein the neural net uses a machine learning algorithm to generate a set of signal profiles from prior collected signals.

19. The method of developing a PNT solution at a remote receiver of claim 17, wherein the neural net is published to the network.

* * * * *